June 29, 1965  B. A. SARAFINAS  3,191,977
ROD END CLIP DEVICE
Filed June 5, 1961

Inventor:
Bruno A. Sarafinas,
by Walter S. Jones
Atty.

United States Patent Office 3,191,977
Patented June 29, 1965

3,191,977
ROD END CLIP DEVICE
Bruno A. Sarafinas, Saugus, Mass., assignor to United-Carr Incorporated, a corporation of Delaware
Filed June 5, 1961, Ser. No. 114,847
3 Claims. (Cl. 287—90)

This invention aims to provide improvements in rod end clip fastener devices and assemblies thereof particularly useful as a swivel joint fastener assembly.

An object of the invention is to provide an assembly including a part presenting a ball-like member, a rod-like member and a clip-like fastener for connecting the two members so that they will be locked together in a swivel-like joint.

Another object of the invention is to provide a new, useful, simple, inexpensive rod end clip preferably formed from a single piece of material that will serve to join two parts into a swivel or ball and socket connection, the clip being slidably attached and constructed and arranged for locking in one position.

In the drawings which illustrate a preferred embodiment of the invention:

Figure 1:
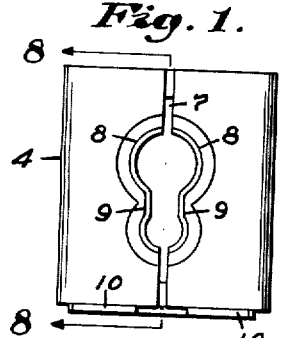
FIG. 1 is a top plan view of the rod end clip per se.

Referring now to the embodiment of the invention selected for illustration and description, there is shown (FIGS. 6 and 7) a part 1 having a ball-like member 2 extending therefrom, a rod-like member 3, and a rod end clip 4 all connected to provide a swivel ball and socket joint. This type of joint has many uses, one example being a door handle and latch mechanism for a motor vehicle. The complete mechanism is not illustrated in the drawings but the part 1 may be the end of a lever on a pull operated door handle and the rod-like member may be a link connecting the part 1 to a remote latch and lock means that holds a door in closed position. In this type of mechanism it is important that the ball and socket joint be easily operable, that it be simple in construction, positive in action, and that the parts be locked against accidental separation, especially since the joint means is usually concealed within a door.

Heretofore, clips, or rod end connectors. have been used that did not lock the parts together with a result that the joint sometimes came apart during operation necessitating an expensive disassembly of a door panel before a repair or replacement could be made. The clip of the invention overcomes that type of trouble because it is constructed to hold the parts in locked position against more than normal twisting stresses during movement of the parts.

The rod end clip 4, illustrated and found satisfactory, is preferably formed as a box like sleeve folded into rectangular tubular shape. It may be made of any springy material and has been found to work quite satisfactorily when made from heat treated carbon steel.

Figure 2:
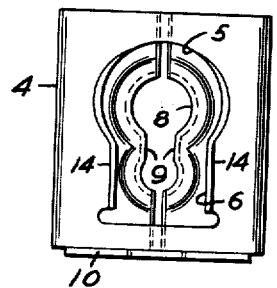
FIG. 2 is a bottom plan view of the clip.

In one face of the sleeve there is formed a keyhole shaped slot (FIG. 2) with an enlarged portion 5 at one end to receive the ball-like member 2 and a reduced portion 6. At an opposite face of the sleeve there is provided a locking means, adjacent to a slot 7 that runs the length of the sleeve (FIG. 1). This locking means includes flared flange portions 8—8 at opposite sides of the slot 7. These flanged portions 8—8 are so shaped that they admit the end of the ball-like member 2 into assembly in one position and provide restricting portions 9—9 to lock the parts together in another position as will be described hereafter.

The clip 4 is provided with flange portions 10 adjacent to one end (FIGS. 1, 2 and 3) to provide bearing portions of substantial area against which a person's fingers may press to prevent injury when the clip is moved during assembly or disassembly of the parts.

The ball member 2 may be attached to the part 1 by a riveting portion 11 (FIG. 7) and the rod-like member 3 is provided with an aperture 12 (FIG. 7) large enough to permit free passage of the ball-like member 2.

Figure 5:
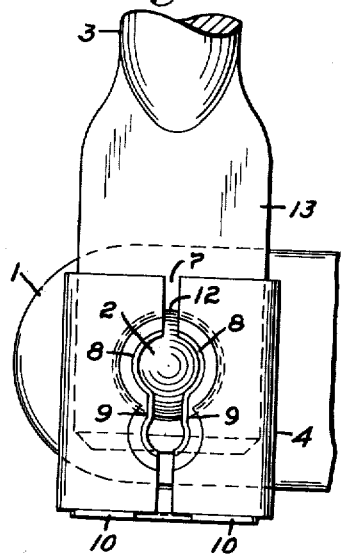
FIG. 5 is a view of the complete installation at a joint with the clip in unlocked position.
Figure 6:
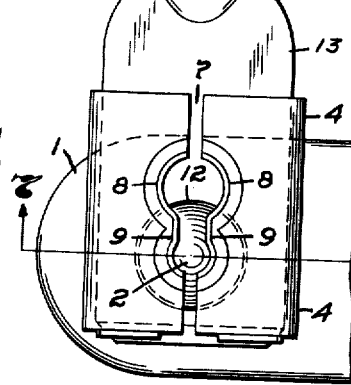
FIG. 6 is a view similar to FIG. 5 with the clip in locked position.
Figure 4:
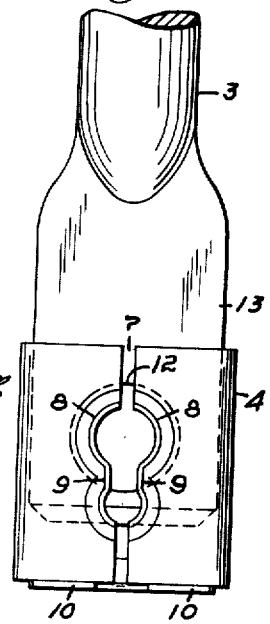
FIG. 4 is a plan view of the clip in the act of being assembled to a rod like member.
Figure 8:
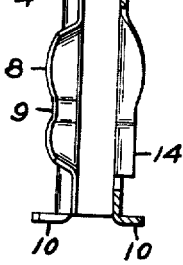
FIG. 8 is a section taken on the line 8—8 of FIG. 1.
Figure 7:
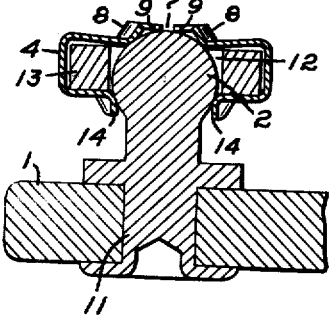
FIG. 7 is a section taken on the line 7—7 of FIG. 6.

Assembly of the parts of the device is an easy matter. First the rod end clip 4 is positioned onto a flattened end 13 of the rod-like member 3 in the manner shown in FIG. 4. During this operation the flanges 10 serve the useful purpose of protecting the fingers of the person performing the operation. The clip is moved to a position on the rod-like member 3 where the enlarged portion 5 of the keyhole shaped slot, in the clip 4, is in line with the aperture 12 in the rod 1 so that the parts are in positions relative to each other as shown in FIG. 5. Finally, the rod end clip 4 is pushed, by pressure exerted against the flanges 10, relative to the rod on the flat end 13 until the restricting portions 9—9 of the flanges 8—8 snap past a given round dimension of the ball-like member 2, as shown in FIG. 6. In this position of the parts the ball-like member is in line with the reduced portion 6 of the keyhole slot and the parts are locked together against separation until the clip is moved in a reverse direction.

Figure 3:
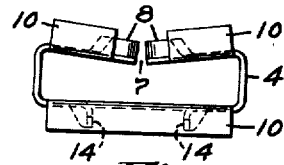
FIG. 3 is an end view of the clip.

The rod end clip 4 has one side thereof dished inwardly to provide a tensioning means so that when the clip is attached to the rod 3 it will remain in a given position until intentionally moved. In the device illustrated the inwardly dished or bowed side is that side where the slot 7 and flared flanges 8—8 are locked, as best shown in FIG. 3.

The clip 4 is also provided with flange portions 14—14 at the opposite edges of the keyhole shaped aperture (FIGS. 2, 3, 7 and 8). These flanges are for the purpose of engaging the ball-like member 2 (FIG. 7) and cooperates with the flanges 8—8 so that the clip will slide from one position to another on the flat part 13 of the rod 2 and relative to the ball 2 without cutting into the ball as might be the case if the flanges were not provided.

It will be understood by those skilled in the art, that the device illustrated and described is simple in construction, easy to assemble, inexpensive and provides a very strong union of the parts while permitting considerable pushing, twisting and straining without becoming disassembled. This is particularly true because of the locking means provided by the rod end clip 4 which is effectively brought into play when the clip is in a predetermined relation to the ball 2 and the rod 3.

While a particular construction of the invention has been illustrated and described, it should be understood that the invention is best defined by the following claims.

I claim:

1. A one piece rod end clip for swivel joints comprising a thin-walled springy tubular sleeve member having a keyhole shaped ball receiving aperture in a face thereof, said sleeve having a passage therein to receive an end of a rod-like member and a ball engaging locking means provided exclusively as a part of said sleeve and laterally offset relative to an entering portion of the keyhole shaped aperture on a face opposite said ball receiving aperture and a slot in said sleeve adjacent to said ball-engaging locking means to permit flexing of said sleeve adjacent to said locking means.

2. A swivel joint fastener assembly including a part having a ball member, a rod-like member and a fastener member for joining the part and rod-like member in operating assembly at the ball member, said fastener member being in the form of a sleeve fitted over one end of the rod-like member, said sleeve having a wall defining a pair of apertures, said wall defining a truncated cone adjacent each of said apertures the first of said apertures having a diameter greater than the second of said apertures, said ball member passing through a keyhole shaped aperture in a portion of said sleeve opposite from said first and second apertures and into abutting engagement with said inner wall at said first aperture and said sleeve having locking means adjacent said second aperture to hold the parts of the assembly together against accidental disassembly when the sleeve is in predetermined relation to the ball member and the ball is over a narrow portion of the keyhole aperture, said sleeve being movable in relation to said ball.

3. A rod end clip for swivel joints comprising a slidable locking and unlocking sleeve, said sleeve member having a ball receiving keyhole-shaped aperture in a face thereof, said sleeve having a passage therein to receive an end of a rod-like member and a ball engaging locking means provided as a part of said sleeve on a face opposite said ball receiving aperture, said sleeve having a rectangular configuration, being dished inwardly at one side to make it self-retaining upon a rod-like member, and also having flange means formed thereon to provide for easy manual sliding of the clip relative to a ball and rod to move the clip relative to a ball and rod to move the clip into either locked or unlocked position.

References Cited by the Examiner

UNITED STATES PATENTS

| 2,530,554 | 11/50 | Tinnerman. |
| 2,817,551 | 12/57 | Gieleghem. |
| 2,854,266 | 9/58 | Dies. |
| 2,987,333 | 6/61 | Lobdell. |

FOREIGN PATENTS

| 738,300 | 10/32 | France. |
| 807,493 | 10/36 | France. |
| 620,266 | 3/49 | Great Britain. |

CARL W. TOMLIN, *Primary Examiner.*

WALTER A. SCHEEL, *Examiner.*